United States Patent
Tang

(10) Patent No.: US 8,234,541 B2
(45) Date of Patent: Jul. 31, 2012

(54) METHOD AND CONTROLLER FOR DATA ACCESS IN A FLASH MEMORY

(75) Inventor: Jiangxun Tang, Shenzhen (CN)

(73) Assignee: Artek Microelectronics Co., Ltd., Shenzhen (CN)

( * ) Notice: Subject to any disclaimer, the term of this patent is extended or adjusted under 35 U.S.C. 154(b) by 356 days.

(21) Appl. No.: 12/646,934

(22) Filed: Dec. 23, 2009

(65) Prior Publication Data

US 2010/0100794 A1 Apr. 22, 2010

Related U.S. Application Data

(63) Continuation of application No. PCT/CN2008/072213, filed on Aug. 29, 2008.

(30) Foreign Application Priority Data

Sep. 7, 2007 (CN) .......................... 2007 1 0149833

(51) Int. Cl.
*G06F 11/00* (2006.01)
(52) U.S. Cl. ...................................... 714/763
(58) Field of Classification Search .................. None
See application file for complete search history.

(56) References Cited

U.S. PATENT DOCUMENTS

| | | | | |
|---|---|---|---|---|
| 5,721,739 | A * | 2/1998 | Lyle | 714/755 |
| 7,222,800 | B2 * | 5/2007 | Wruck | 236/51 |
| 2006/0053235 | A1 * | 3/2006 | Terada et al. | 710/16 |
| 2007/0028030 | A1 * | 2/2007 | Mahrla et al. | 711/100 |
| 2007/0170268 | A1 | 7/2007 | Lee | |
| 2011/0219179 | A1 * | 9/2011 | Lee | 711/103 |

FOREIGN PATENT DOCUMENTS

| | | |
|---|---|---|
| CN | 1480953 A | 3/2004 |
| CN | 1831786 A | 9/2006 |
| CN | 101004664 A | 7/2007 |
| CN | 101008891 A | 8/2007 |
| CN | 101140809 A | 3/2008 |

OTHER PUBLICATIONS

English Translation of First Examination Report (mailed May 8, 2009) for related Chinese Application Serial No. 2007 101 49 833.4.
English Translation of Second Examination Report (mailed Sep. 11, 2009) for related Chinese Application Serial No. 2007 101 49 833.4.
"A design of a configurable Nand-Flash controller," Xue et al., Information Technology, China Academic Journal Electronic Publishing House, 2006 (English Abstract Provided).
"One Method to Realize Nand Flash Controller in SoC Chip," Xiao, J., Journal of Nanjing University of Posts and Telecommunications, China Academic Journal Electronic Publishing House, 2005 (English Abstract Provided).

* cited by examiner

*Primary Examiner* — Christopher McCarthy
(74) *Attorney, Agent, or Firm* — Baker & Hostetler LLP

(57) ABSTRACT

A method for controlling access to data in a Flash is provided, including steps as follows: outputting at least one main data block to a buffer area of the Flash continuously, the buffer area of the Flash being adapted to buffer data to be inputted to a storage area of the Flash; generating and buffering checksum data for each main data block while outputting the at least one main data block; and outputting the buffered checksum data of the at least one main data block to the buffer area of the Flash. Another method for controlling access to data in the Flash, apparatuses corresponding to the methods and methods for controlling data access by a controller are also provided. The efficiency of data access in the Flash is raised.

16 Claims, 6 Drawing Sheets

METHOD AND CONTROLLER FOR DATA ACCESS IN A FLASH MEMORY

CROSS-REFERENCE TO RELATED APPLICATIONS

This application is a Continuation of International patent application PCT/CN2008/072213, filed on Aug. 29, 2008, which claims priority to foreign patent application CN 200710149833.4, filed on Sep. 7, 2007.

FIELD OF THE INVENTION

The present invention relates to Flash Memory technology, and particularly to a Flash controller and a controlling method thereof.

BACKGROUND OF THE INVENTION

A Flash memory (may be called Flash for short), as a storage medium, is a nonvolatile memory and has features of information therein still being usable after power down, and being erasable and reprogrammable repeatedly. Currently, an embedded system with the Flash memory as the storage medium has been applied widely.

The basic processing unit for a conventional Flash controller is usually a data block (the size of which is generally 512 bytes), for which ECC (Error Checking and Correcting) correction is also preformed by the Flash controller. In a prior art, after transmitting one main data block of 512 bytes, the Flash controller needs to send a command and an address again in order to start transmission for the next main data block of 512 bytes. In other words, the transmission of the next main data block of 512 bytes can only be started after the one main data block of 512 bytes has been transmitted and the ECC correction for the main data block has been performed, that is, a serial processing manner is adopted in the prior art.

SUMMARY OF THE INVENTION

Embodiments of the present invention provide a method and controller for data access in a Flash to raise controlling efficiency in the Flash controller.

An embodiment of the present invention provides a method for controlling access to data in a Flash, including:

outputting at least one main data block to a buffer area of the Flash continuously, the buffer area of the Flash being adapted to buffer data to be output to a storage area of the Flash;

generating checksum data for each main data block and buffering the generated checksum data when outputting the at least one main data block to the buffer area of the Flash; and, outputting the buffered checksum data of the at least one main data block to the buffer area of the Flash.

An embodiment of the present invention further provides a method for controlling access to data in a Flash, including:

buffering checksum data of at least one main data block from a buffer area of the Flash, the buffer area of the Flash being adapted to buffer the at least one main data block and the checksum data thereof from a storage area of the Flash; and, reading the at least one main data block from the buffer area of the Flash continuously, and checking and correcting errors of the at least one main data block according to the buffered checksum data of the at least one main data block when reading the at least one main data block continuously.

An embodiment of the present invention further provides a controller for controlling access to data in a Flash, including:

a first unit, adapted to output at least one main data block continuously to a buffer area of the Flash, and write the at least one main data block and checksum data thereof into a storage area of the Flash from the buffer area of the Flash after a second unit outputs to the buffer area of the Flash the checksum data buffered in the second unit; and, the second unit, adapted to generate the checksum data for each main data block and buffer the generated checksum data when the first unit outputs the at least one main data block to the buffer area of the Flash, and output the buffered checksum data of the at least one main data block to the buffer area of the Flash.

An embodiment of the present invention further provides a controller for controlling access to data in a Flash, including:

a first unit, adapted to continuously transmit at least one main data block and checksum data thereof from a storage area of the Flash to a buffer area of the Flash, and instruct the buffer area of the Flash to transmit the checksum data to a second unit, and continuously read the at least one main data block from the buffer area of the Flash; and the second unit, adapted to buffer the checksum data of the at least one main data block from the buffer area of the Flash, and check and correct errors of the at least one main data block according to the buffered checksum data when the first unit reads the at least one main data block from the buffer area of the Flash.

An embodiment of the present invention further provides a method for controlling data access by a controller, the controller including a check unit adapted to generate checksum data and check main data, and more than one standard control unit, each standard control unit being adapted to perform at least one data access function and being configured with one enabling parameter; the more than one standard control unit including: a ready/busy state detection unit, a first command unit, a second command unit, an address sending unit, a transmission unit and a switching unit, which are configured as being performed one by one in an order of: the ready/busy state detection unit, the first command unit, the address sending unit, the transmission unit, the switching unit and the second command unit, and the performed order forming a standard procedure;

the process of the data access including a first stage and a second stage, wherein:

in the first stage, the enabling parameters of the ready/busy state detection unit, the first command unit, the address sending unit, the transmission unit and the switching unit are configured as to be performed, and the enabling parameter of the second command unit is configured as to be bypassed;

when the standard procedure is performed in the first stage, if the ready/busy state detection unit detects that the Flash is ready, the first command unit sends a write operation command to the Flash, the address sending unit sends a first address to the Flash, the transmission unit writes at least one main data block into a buffer area of the Flash according to the first address sent by the address sending unit, and each time when one main data block is written, the switching unit instructs the check unit to buffer the checksum data generated for the one main data block currently written and to prepare for generating the checksum data for the next main data block to be written;

in the second stage, the enabling parameters of the first command unit, the address sending unit, the transmission unit, the switching unit and the second command unit are configured as to be performed, and the enabling parameters of the ready/busy state detection unit and the switching unit are configured as to be bypassed; and when the standard procedure is performed in the second stage, the first command unit sends an address rewriting command to the Flash, the address sending unit sends a second address to the Flash, the transmission unit continuously outputs the checksum data of the at least one main data block to the buffer area of the Flash according to the second address sent by the address sending unit, the second command unit outputs to the storage area of the Flash the at least one main data block and the checksum data thereof from the buffer area of the Flash.

An embodiment of the present invention further provides a method for controlling data access by a controller, the controller including a check unit adapted to generate checksum data and check main data, and more than one standard control unit, each standard control unit being adapted to perform at least one data access function and being configured with one enabling parameter; the more than one standard control unit including: a first ready/busy state detection unit, a second ready/busy state detection unit, a first command unit, a second command unit, an address sending unit, a transmission unit and a switching unit, which are configured as being performed one by one in an order of: the first ready/busy state detection unit, the first command unit, the address sending unit, the second command unit, the second ready/busy state detection unit, the transmission unit and the switching unit, and the performed order forming a standard procedure;

the process of the data access including a first stage and a second stage, wherein:

in the first stage, the enabling parameters of the first ready/busy state detection unit, the first command unit, the address sending unit, the second command unit, the second ready/busy state detection unit and the transmission unit are configured as to be performed, and the enabling parameter of the switching unit is configured as to be bypassed;

when the standard procedure is performed in the first stage, if the first ready/busy state detection unit detects that the Flash is ready, the first command unit sends a read operation command to the Flash, the address sending unit sends a third address to the Flash, the second command unit instructs the Flash to read into a buffer area of the Flash at least one main data block and the checksum data thereof from a storage area of the Flash according to the third address sent by the address sending unit, and the transmission unit reads the checksum data from the buffer area of the Flash if the second ready/busy state detection unit detects that the Flash is ready;

in the second stage, the enabling parameters of the first command unit, the address sending unit, the transmission unit and the switching unit are configured as to be performed, and the enabling parameters of the first ready/busy state detection unit, the second command unit and the second ready/busy state detection unit are configured as to be bypassed; and when the standard procedure is performed in the second stage, the first command unit sends an address rewriting command to the Flash, the address sending unit sends a fourth address to the Flash, the transmission unit continuously reads the at least one main data block according to the fourth address sent by the address sending unit, and each time when one main data block is read, the switching unit instructs the check unit to buffer a checking result of the one main data block currently read and to prepare for checking the next main data block to be read.

An embodiment of the present invention further provides a method for controlling data access by a controller, the controller including a check unit adapted to generate checksum data and check main data, and more than one standard control unit, each standard control unit being adapted to perform at least one data access function and being configured with one enabling parameter; the more than one standard control unit including: a first ready/busy state detection unit, a second ready/busy state detection unit, a first command unit, a second command unit, a third command unit, an address sending unit, a transmission unit and a switching unit, which are configured as being performed one by one in an order of: the first ready/busy state detection unit, the first command unit, the address sending unit, the second command unit, the second ready/busy state detection unit, the transmission unit, the switching unit and the third command unit, and the performed order forming a standard procedure;

the process of the data access including a write operation and/or a read operation, the write operation including a first stage and a second stage and the read operation including a third stage and a fourth stage, wherein:

in the first stage, the enabling parameters of the first ready/busy state detection unit, the first command unit, the address sending unit, the transmission unit and the switching unit are configured as to be performed, and the enabling parameters of the second command unit, the second ready/busy state detection unit and the third command unit are configured as to be bypassed;

when the standard procedure is performed in the first stage, if the first ready/busy state detection unit detects that the Flash is ready, the first command unit sends a write operation command to the Flash, the address sending unit sends a first address to the Flash, the transmission unit writes at least one main data block into a buffer area of the Flash according to the first address sent by the address sending unit, and each time when one main data block is written, the switching unit instructs the check unit to buffer the checksum data generated for the one main data block currently written and to prepare for generating the checksum data for the next main data block to be written;

in the second stage, the enabling parameters of the first command unit, the address sending unit, the transmission unit, the switching unit and the second command unit are configured as to be performed, and the enabling parameters of the first ready/busy state detection unit, the second ready/busy state detection unit, the switching unit and the third command unit are configured as to be bypassed;

when the standard procedure is performed in the second stage, the first command unit sends an address rewriting command to the Flash, the address sending unit sends a second address to the Flash, the transmission unit continuously outputs the checksum data of the at least one main data block to the buffer area of the Flash according to the second address sent by the address sending unit, the second command unit outputs to the storage area of the Flash the at least one main data block and the checksum data thereof from the buffer area of the Flash;

in the third stage, the enabling parameters of the first ready/busy state detection unit, the first command unit, the address sending unit, the second command unit, the second ready/busy state detection unit and the transmission unit are configured as to be performed, and the enabling parameters of the switching unit and the third command unit are configured as to be bypassed;

when the standard procedure is performed in the third stage, if the first ready/busy state detection unit detects that the Flash is ready, the first command unit sends a read operation command to the Flash, the address sending unit sends a third address to the Flash, the second command unit instructs the Flash to read into the buffer area of the Flash at least one main data block and the checksum data thereof from the storage area of the Flash according to the third address sent by the address sending unit, and the transmission unit reads the checksum data from the buffer area of the Flash if the second ready/busy state detection unit detects that the Flash is ready;

in the fourth stage, the enabling parameters of the first command unit, the address sending unit, the transmission unit and the switching unit are configured as to be performed, and the enabling parameters of the first ready/busy state detection unit, the second command unit, the second ready/busy state detection unit and the third command unit are configured as to be bypassed; and when the standard procedure is performed in the fourth stage, the first command unit sends an address rewriting command to the Flash, the address sending unit sends a fourth address to the Flash, the transmission unit continuously reads the at least one main data block according to the fourth address sent by the address sending unit, and each time when one main data block is read, the switching unit instructs the check unit to buffer the checking result of the one main data block currently read and to prepare for checking the next main data block to be read.

DETAILED DESCRIPTION

In the prior art, the basic processing unit in a write operation is a main data block of 512 bytes, and the specific procedure is as follows:

A Flash controller receives a Flash write operation command from CPU firstly, points an address pointer of the write operation to a Flash's maim data area, and writes one main data block into a main data area in a buffer of the Flash, and simultaneously, a coder of error correction codes performs coding, and after one main data block is transmitted, the coder also completes the coding and outputs checksum data such as error correction codes. The Flash controller points the address pointer for the write operation to the Flash's spare area, writes a coding result into a spare area in the buffer of the Flash, and then sends to a storage area of the Flash the main data block and the checksum data (e.g., error correction codes) of the main data block from the buffer of the Flash. Finally, the Flash controller returns the coding result to the CPU, and after checking the coding result, the CPU sends to the Flash controller a command to perform a write operation for the next main data block.

Figure 1:
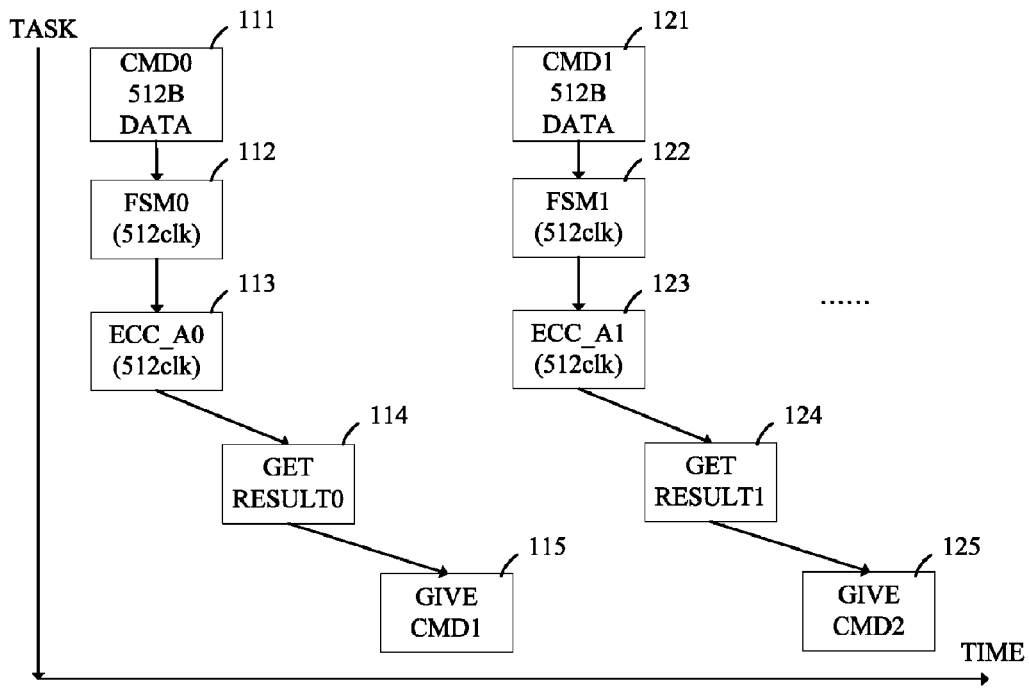
FIG. 1 is a schematic diagram illustrating a sequential chart of a Flash write operation in the prior art.

FIG. 1 is a schematic diagram illustrating a sequential chart of a write operation in the prior art. As shown in FIG. 1, a Flash controller receives from a CPU a command of performing a write operation for a main data block of 512 bytes in Step 111, writes in a main data block of 512 bytes when going to Step 112, and generates the checksum data of the main data block in Step 113. As can be seen from the sequence chart, either of Steps 112 and 113 occupies 512 clock periods. In Step 114, each time when a main data block of 512 bytes is written into the Flash, a coding result (GET RESULT0) is sent to the CPU. In Step 115, the CPU outputs a command of performing a write operation (GIVE CMD1) for the next main data block of 512 bytes. In Steps 121 to 125, the write operation is performed for the next main data block. Inventor of the present invention finds that, in the above technical scheme, extra clock resources are occupied because of frequent CPU intervention, and the efficiency of the write operation in the whole Flash is thus too low.

In the prior art, the basic processing unit in a read operation is also a main data block of 512 bytes, and the specific procedure is as follows:

A Flash controller receives a Flash read operation command from a CPU at first, reads into a buffer of the Flash a main data block needed to be read as well as its error correction codes, points an address pointer for reading to the Flash's spare area, and reads in the error correction codes of the main data block currently needed to be read. Then, the Flash controller points the Flash address pointer (i.e., the address pointer for reading) to the main data area of the Flash and reads the main data block from the main data area of the buffer of the Flash, and meanwhile, algorithm B for the error correction codes is also performed. After the main data block is read, if a processing result of algorithm B indicates that main data are in error, the processing result of algorithm B is outputted to algorithm C for calculation, and a processing result of algorithm C is outputted to algorithm D for calculation. Finally, the Flash controller sends a result to the CPU, and after checking the result, the CPU sends to the Flash controller a command to perform a read operation for the next main data block. After all the main data blocks in this read operation have been read, a data error report including addresses of the error main data blocks in this read operation is sent to the CPU.

Figure 2:
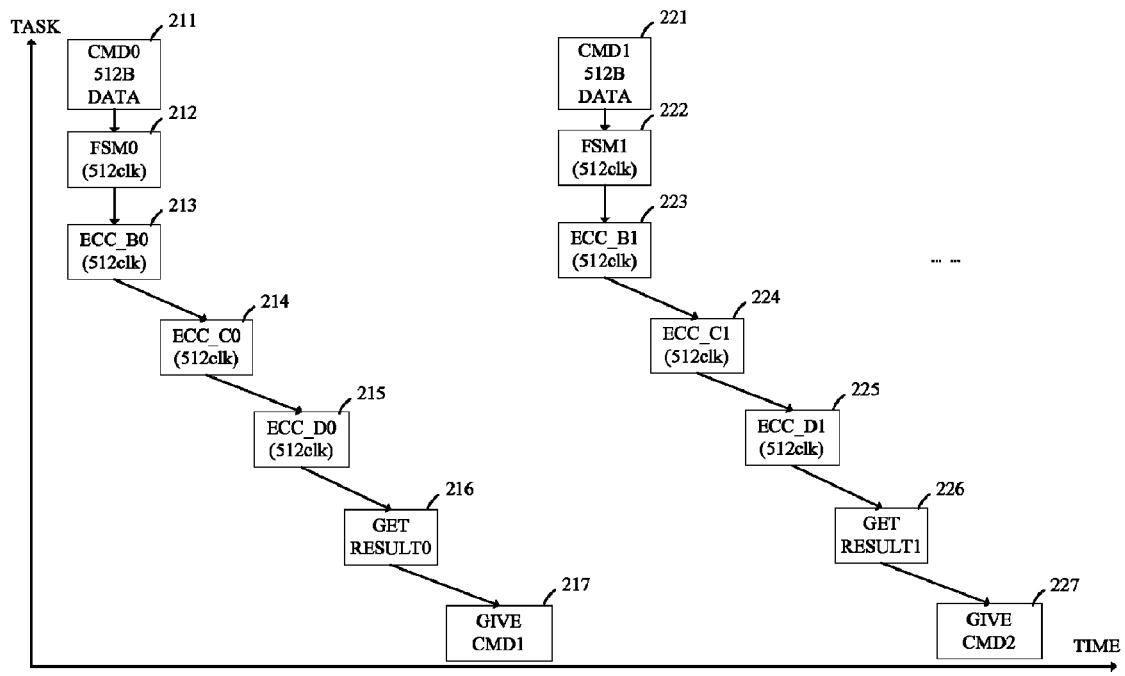
FIG. 2 is a schematic diagram illustrating a sequential chart of a Flash read operation in the prior art.

FIG. 2 is a schematic diagram illustrating a sequential chart of a read operation in the prior art. As shown in FIG. 2, after receiving a read operation command sent by a CPU in Step 211, a Flash controller starts Step 212 to read a main data block of 512 bytes. Meanwhile, the main data block being read is checked in Step 213, and as can be seen from the sequential chart, both of Steps 212 and 213 occupy 521 clock periods. If a check result in Step 213 indicates that data are in error, the main data block in error is processed in Step 214 and Step 215 in serial. In Step 216, the Flash controller sends a result of the processing in serial to the CPU. In Step 217, the CPU gives a next read operation command. From Step 221 to Step 227, the next main data block is read. Inventor of the present invention finds that, in the prior method for reading the Flash's main data, extra clock periods are occupied because of frequent intervention from the CPU and thus efficiency of the Flash's read operation is low. Besides, referring to FIG. 2, Inventor of the present invention also finds that, if a processing result of algorithm B indicates that a main data block is in error, algorithms C and D are further needed to be performed for data correction, and consequently, the whole procedure of reading the Flash's main data occupies more clock periods, and the efficiency of the read operation is much lower. Moreover, when a circuit for performing algorithm C or D works, a circuit for reading the main data and a circuit for performing algorithm B are in an idle state, and as a result, the usage of hardware is not high.

As can be seen from the above, Inventor of the present invention finds that, in the prior art, all the operations take a 512-byte data block as the basic processing unit. The read/write operations are processed in serial, and when a part of circuits in the controller is working, the other part of circuits is in the idle state. For example, during an ECC check for a main data block in the read operation, if it is found that the main data block is in error, error correction circuits of a three-level structure are adopted for error correction, where, in each level, the input of a circuit is based on the output of a circuit in the previous level; and in the prior art, while the second-level error correction circuit is working, the error correction circuits in the other two levels are in the idle state because there is no input; and meanwhile, because it needs 512 clock periods to read the main data block of 512 bytes and it takes nearly 512 clock periods to perform one-level error correction, when error corrections of the latter two levels are being performed, the transmission of the corresponding main data block has been completed and the circuit for transmitting the main data block is in the idle state. In the prior art, for each main data block of 512 bytes, the Flash controller needs to receive from the CPU the control command and configuration for the Flash controller's working states, switch the address between the main data area and the spare area of the Flash, and return an operation result to the CPU. Therefore, the address switching and the CPU's controlling to the Flash controller is needed when reading or writing each main data block of 512 bytes in the prior art, which causes the low efficiency of reading/writing. Besides, during the read operation of the main data, error correction of the three-level structure is adopted and the error correction per level takes near 512 clock periods, and thus three levels of the error correction take more than 1000 clock periods, which are far more than 512 clock periods needed to read one main data block. In the prior art, the complete reading procedure for each main data block of 512 bytes requires completion of corresponding ECC correction, and therefore, when one main data block being read is in error, time actually needed to read the one main data block of 512 bytes is far longer than that needed to read only the main data block itself, which results in a situation that the ECC correction restricts transmission performance.

In addition, the current size of a Flash page has already reached 4K bytes, and it is needed practically that: the read and write operations for data of any size within the Flash page can be provided, the ECC correction can also be performed simultaneously, and it is unnecessary to perform the read and write operations for the Flash's main data taking 512 bytes as one unit. However, the conventional technical scheme for performing the read and write operations, which takes 512 bytes as one unit, can not satisfy demands of practical applications.

Therefore, Inventor of the present invention provides a method for access control in a Flash as well as a corresponding Flash controller. Embodiments of the present invention will be described in detail in accordance with accompanying drawings.

Figure 3:
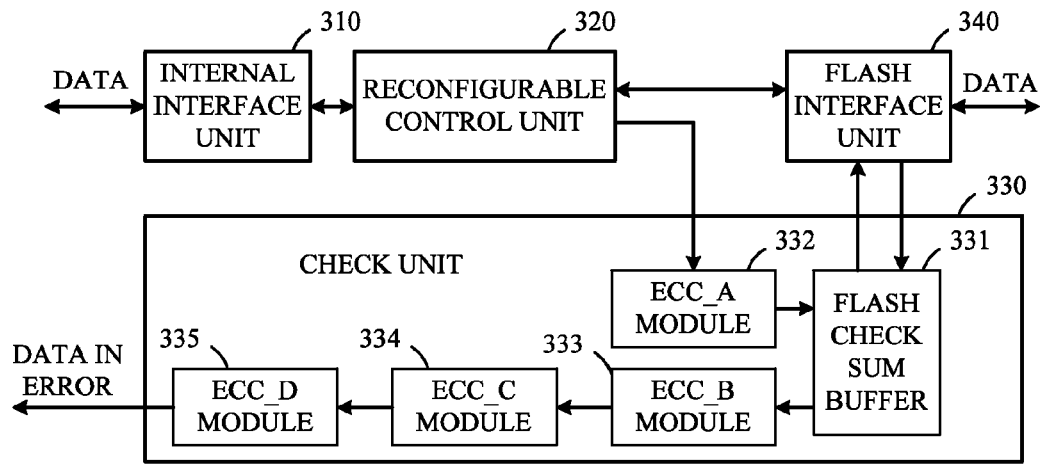
FIG. 3 is a schematic diagram illustrating a general structure of a Flash controller in accordance with an embodiment of the present invention.

FIG. 3 is a schematic diagram illustrating a structure of the Flash controller. As shown in FIG. 3, the Flash controller at least includes: a reconfigurable control unit 320 and a check unit 330. During a write operation, the reconfigurable control unit 320, i.e., a first unit, is adapted to output at least one main data block continuously to a buffer area of a Flash, and, after the check unit 330, i.e., a second unit, outputs all checksum data of the at least one main data block which are buffered therein to the buffer area of the Flash, the reconfigurable control unit 320 is adapted to write into a storage area of the Flash both the at least one main data block and the checksum data thereof from the buffer area of the Flash; and, the check unit 330 is adapted to generate and buffer the checksum data for each main data block while the reconfigurable control unit 320 outputs the at least one main data block to the buffer area of the Flash, and to output the buffered checksum data of the at least one main data block to the buffer area of the Flash. During a read operation, the reconfigurable control unit 320 is adapted to continuously output to the buffer area of the Flash the at least one main data block and the checksum data of the at least one main data block from the storage area of the Flash, to output the checksum data from the buffer area of the Flash to the check unit 330, and to continuously output the at least one main data block from the buffer area of the Flash; and, the check unit 330 is adapted to buffer the checksum data outputted by the reconfigurable control unit 320 from the buffer area of the Flash, and to use the checksum data to check errors of the at least one main data block and correct the errors while the reconfigurable control unit 320 outputs the at least one main data block from the buffer area of the Flash.

The Flash controller may further include an internal interface unit 310, i.e., a third unit. The reconfigurable control unit 320 is adapted to continuously output the at least one main data block to the buffer area of the Flash after receiving via the internal interface unit 310 a command of starting write operation sent by the CPU, and, after writing into the storage area of the Flash the at least one main data block as well as the checksum data of the at least one main data block from the buffer area of the Flash, the reconfigurable control unit 320 is adapted to send an interrupt to the CPU via the internal interface unit 310, receive a state from the CPU, and send state information for indicating whether the write operation is successful to the CPU. The reconfigurable control unit 320 is also adapted to output to the buffer area of the Flash the at least one main data block as well as the checksum data of the at least one main data block from the storage area of the Flash after receiving via the internal interface unit 310 a command of starting read operation sent by the CPU, send an interrupt to the CPU via the internal interface unit 310 after outputting the at least one main data block from the buffer area of the Flash, receive a state from the CPU, and send state information for indicating whether the read operation is successful to the CPU.

The Flash controller may further include a Flash interface unit 340, i.e., a fourth unit. The reconfigurable control unit 320 is adapted to continuously output the at least one main data block to the buffer area of the Flash via the Flash interface unit 340, and output the buffered checksum data to the buffer area of the Flash via the Flash interface unit 340. Further, the reconfigurable control unit 320 is adapted to continuously output the at least one main data block from the buffer area of the Flash via the Flash interface unit 340. The check unit 330 is adapted to output the checksum data from the buffer area of the Flash via the Flash interface unit 340.

The check unit 330 may include the following modules: a check sum buffer 331 (refers to a Flash check sum buffer 331 in FIG. 3), i.e., a second module 331, which is adapted to buffer the checksum data outputted via the Flash interface unit 340 and buffer the checksum data generated by an ECC_A module 332, i.e., a first module 332; the ECC_A module 332, which is adapted to generate the checksum data for each main data block while the reconfigurable control unit 320 outputs the at least one main data block to the buffer area of the Flash, and output to the buffer area of the Flash the checksum data of the at least one main data block buffered by the check sum buffer 331; an ECC_B module 333, i.e., a third module 333, which with respect to each main data block continuously outputted by the reconfigurable control unit 320 from the buffer area of the Flash, is adapted to process the checksum data of each main data block stored in the check sum buffer 331 according to a first algorithm, determine whether a certain main data block is in error, and send a processing result of the first algorithm to an ECC_C module 334 (i.e., a fourth module 334) if it is determined that a certain data block is in error; the ECC_C module 334, which is adapted to process the processing result of the first algorithm sent by the ECC_B module 333 if the ECC_B module 333 determines that a certain data block is in error; and an ECC_D module 335, i.e., a fifth module 335, which is adapted to process a processing result of the second algorithm sent by the ECC_C module 334 according to a third algorithm, record a processing result of the third algorithm, and output an error report after the at least one main data block has been read continuously.

The above functions of the Flash controller may also be performed by two separate controllers.

Figure 4:
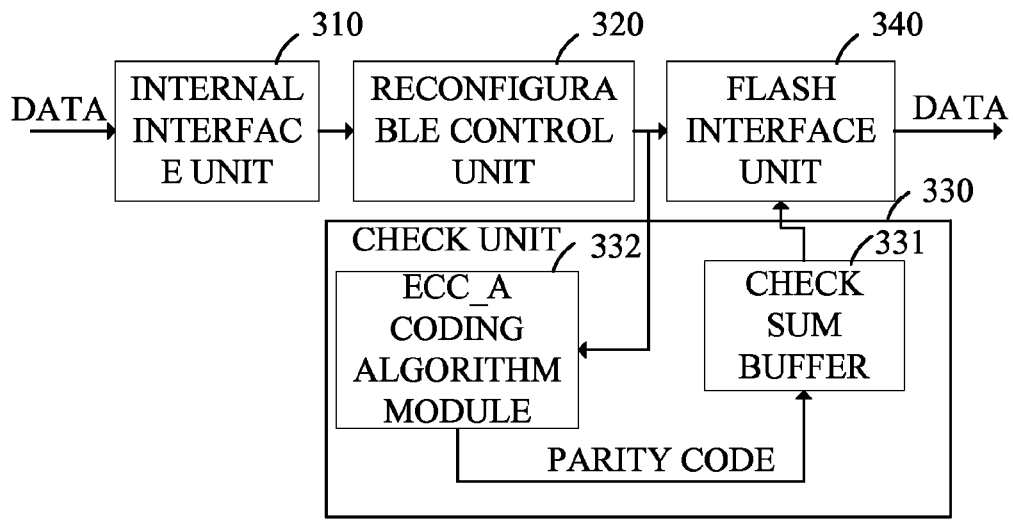
FIG. 4 is a schematic diagram illustrating a structure of a Flash controller for write operations in accordance with an embodiment of the present invention.

FIG. 4 is a schematic diagram illustrating a structure of a Flash controller for write operations in accordance with an embodiment of the present invention. As shown in FIG. 4, the Flash controller in accordance with the embodiment of the present invention at least includes a reconfigurable control unit 320 and a check unit 330. The reconfigurable control unit 320 is adapted to continuously output at least one main data block to a buffer area of a Flash, and after the check unit 330 outputs all the checksum data of the at least one main data block buffered therein to the buffer area of the Flash, the reconfigurable control unit 320 is adapted to write the at least one main data block as well as the checksum data of the at least one main data block into the storage area of the Flash from the buffer area of the Flash. The check unit 330 is adapted to generate and buffer the checksum data for each main data block while the reconfigurable control unit 320 outputs the at least one main data block to the buffer area of the Flash, and output the buffered checksum data of the at least one main data block to the buffer area of the Flash.

The Flash controller in accordance with the embodiment of the present invention may further include an internal interface unit 310. The reconfigurable control unit 320 is adapted to continuously output the at least one main data block to the buffer area of the Flash after receiving via the internal interface unit 310 a command of starting write operation sent by the CPU, send an interrupt to the CPU via the internal interface unit 310 after writing into the storage area of the Flash the at least main data block as well as the checksum data of the at least main data block from the buffer area of the Flash, receive a state from the CPU, and send state information for indicating whether the write operation is successful to the CPU.

The Flash controller in accordance with the embodiment of the present invention may further include a Flash interface unit 340. The reconfigurable control unit 320 continuously outputs the at least one main data block to the buffer area of the Flash via the Flash interface unit 340, and outputs the buffered checksum data to the buffer area of the Flash via the Flash interface unit 340.

The check unit in accordance with an embodiment of the present invention includes: an ECC_A module 332 (refers to an ECC_A coding algorithm module 332 in FIG. 4), i.e., a first module 332, which is adapted to generate the checksum data for each main data block after the reconfigurable control unit 320 outputs the at least one main data block to the buffer area of the Flash, and output the checksum data of the at least one main data block from a check sum buffer 331 to the buffer area of the Flash; and, the check sum buffer 331, i.e., a second module 331, which is adapted to buffer the checksum data generated by the first module 332.

In detail, as shown in FIG. 4, the Flash interface unit 340 is adapted to forward to the Flash a Flash address of a main data block to be written in and a command to be operated inside the Flash, for example, a command indicating the Flash that data of the Flash's buffer area is to be written into the Flash. The Flash interface unit 340 is further adapted to forward data transmitted between the Flash controller and the Flash, for example, the main data block and the checksum data thereof which are written into the Flash. The check sum buffer 331 mainly stores the checksum data, such as the ECC correction codes, so as to perform pipelining coding/decoding for the error correction codes. The ECC_A coding algorithm module 332 is adapted to generate the checksum data for each main data block inputted to the Flash. The reconfigurable control unit 320 controls the whole procedure of the write operation, and is designed to adopt a software-configurable Finite State Machine (FSM). The internal interface unit 310 mainly includes internal interface buses, and is adapted to forward data transmitted between the reconfigurable control unit 320 and the CPU, for example, forward a control command (e.g., the command of starting write operation) sent by the CPU and forward to the CPU the interrupt after the main data are written completely.

After a write operation is started, main data blocks are continuously inputted via the internal interface unit 310, transmitted to the reconfigurable control unit 320, and continuously sent into the Flash via the Flash interface unit 340. During this process of transmitting the main data blocks, the ECC coder 332 (refers to the ECC_A coding algorithm module 332 in FIG. 4), acting as an error correcting and coding module, obtains the main data blocks from the reconfigurable control unit 320 and performs the error correcting and coding, inputs the coded error correction codes (The error correction code may also be called parity code as shown in FIG. 4) to the error correction code buffer 331 (i.e., the check sum buffer 331 in FIG. 4). The step of the error correcting and coding is performed synchronously with the step of transmitting the main data blocks.

Figure 5:
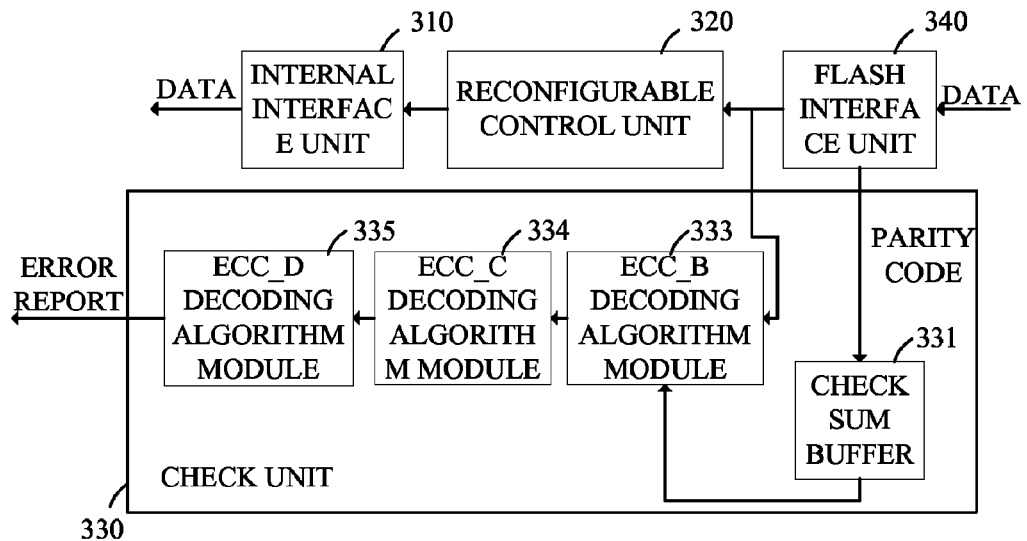
FIG. 5 is a schematic diagram illustrating a structure of a Flash controller for read operations in accordance with an embodiment of the present invention.

FIG. 5 is a schematic diagram illustrating a structure of a Flash controller for read operations in accordance with an embodiment of the present invention. As shown in FIG. 5, the Flash controller at least includes a reconfigurable control unit 320 and a check unit 330. The reconfigurable control unit 320 is adapted to continuously output to a buffer area of a Flash at least one main data block as well as checksum data of the at least one main data block from a storage area of the Flash, output the checksum data to the check unit 330 from the buffer area of the Flash, and continuously output the at least one main data block from the buffer area of the Flash. The check unit 330 is adapted to buffer the checksum data read from the buffer area of the Flash by the reconfigurable control unit 320 and use the checksum data to check errors of the at least one main data block and correct the errors while the reconfigurable control unit 320 outputs the at least one main data block from the buffer area of the Flash.

Herein, the reconfigurable control unit 320 is adapted to output the at least one main data block as well as the checksum data of the at least one main data block to the buffer area of the Flash from the storage area of the Flash after receiving via the internal interface unit 310 a command of starting read operation sent by the CPU, send an interrupt to the CPU via the internal interface unit 310 after outputting the at least one main data block from the buffer area of the Flash, receive a state from the CPU, and send state information for indicating whether the read operation is successful to the CPU. The reconfigurable control unit 320 continuously outputs the at least one main data block via the Flash interface unit 340 from the buffer area of the Flash. The check unit 330 outputs the checksum data via the Flash interface unit 340 from the buffer area of the Flash.

Herein, the check unit 330 includes: a check sum buffer 331, i.e., a second module 331, which is adapted to buffer the checksum data outputted via the Flash interface unit 340; an ECC_B module 333 (refers to an ECC_B decoding algorithm module 333 in FIG. 5), i.e., a third module 333, which with respect to each main data block continuously outputted by the reconfigurable control unit 320 from the buffer area of the Flash, is adapted to process the checksum data of the main data block stored in the check sum buffer 331 according to a first algorithm to determine whether the main data block is in error, and to send a processing result of the first algorithm to an ECC_C module 334 (i.e., a fourth module 334, refers to an ECC_C decoding algorithm module 334 in FIG. 5) if it is determined that the main data block is in error; the ECC_C module 334, which is adapted to process the processing result of the first algorithm sent by the ECC_B module 333 according to a second algorithm if the ECC_B module 333 determines that the main data block is in error; and, an ECC_C module D 335 (refers to an ECC_D decoding algorithm module 335 in FIG. 5), i.e., a fifth module 335, which is adapted to process a processing result of the second algorithm sent by the ECC_C module 334 according to a third algorithm, record a processing result of the third algorithm, and output an error report after the continuously reading of the at least one main data block is completed.

In detail, as shown in FIG. 5, the Flash interface unit 340 is adapted to forward data transmitted between the Flash controller and the Flash, such as the main data block and the checksum data thereof which are read from the Flash and a command to be operated inside the Flash. The checksum data may also be called the parity code as shown in FIG. 4. The check sum buffer 331 is adapted to store the checksum data read from the Flash, such as the error correction codes. The decoding algorithm modules, ECC_B, ECC_C and ECC_D (refer to the ECC_B decoding algorithm module 333, ECC_C decoding algorithm module 334, and ECC_D decoding algorithm module 335), are adapted to check errors of each read main data block and correct the errors thereof in turn according to the checksum data stored in the check sum buffer 331. The internal interface unit 310 is adapted to forward data transmitted between the reconfigurable control unit 320 and the CPU, for example, forward the control command (e.g., the command of starting write operation) sent by the CPU and forward to the CPU the interrupt after the main data are written completely. The reconfigurable control unit 320 is adapted to control the whole procedure of the read operation.

After a read operation is started, because the checking needs error correction code information, the error correction codes in the Flash are read into the check sum buffer 331 before the main data are read. The reconfigurable control unit 320 controls the Flash interface unit 340 to send to the Flash a read command and addresses of the main data to be read, continuously read the main data blocks into the Flash interface unit 340 and then transmit the main data to the internal interface unit 310 via the reconfigurable control unit 320. While the main data are being read into the internal interface unit 310, the error correction codes are sent to the ECC_B error correction code module 333 (refers to either the ECC_B module 333 mentioned above or ECC_B decoding algorithm module 333 in FIG. 5) for error correction calculations. If a result of the ECC_B error correction calculation indicates that a certain main data block is in error, the result of the ECC_B error correction code module 333 is sent to the ECC_C module 334 and the ECC_D module 335 in turn for calculations. At the same time, the ECC_B module 333 continues the error correction calculation for each subsequent main data block. The whole procedure of transmitting the main data blocks is performed in such a pipelining manner.

Figure 6:
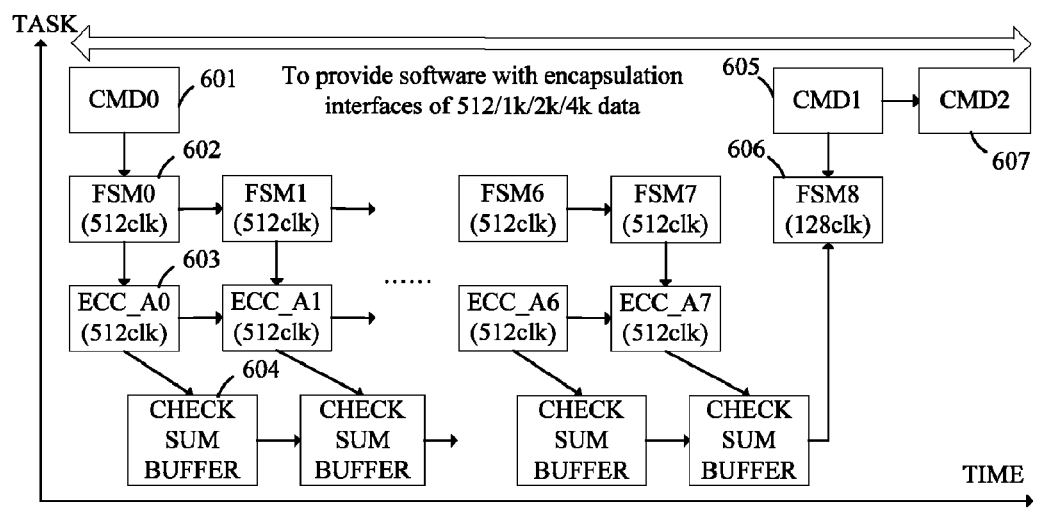
FIG. 6 is a schematic diagram illustrating a sequential chart of a write operation in accordance with an embodiment of the present invention.

Under the control of the Flash controller, the sequential chart of a write operation is shown in FIG. 6. In Step 601, after receiving a command of starting write operation sent by a CPU, a reconfigurable control unit sends a first command (CMD0) to the Flash to make a Flash address (i.e., an address pointer for writing) point to an address configured by the CPU which is namely the address of a main data area in the Flash. In Step 602, main data are sent to a buffer area of the Flash via the reconfigurable control unit. As can be seen from FIG. 6, according to the embodiment of the present invention, the amount of the data once written into the Flash is not limited to one data block such as 512 bytes, but may be integral multiples of 512 bytes instead only if the amount of the data once written into the Flash is smaller than the size of the Flash page, e.g., 4K bytes. The amount of the data once written into the Flash may be configured according to demands, for example 512 bytes, 1K bytes, 2K bytes, 4K bytes or etc. The reconfigurable control unit is adapted not only to control transmission operation of the main data but also to control the ECC coder's working. In Step 603, while transmitting the main data, the ECC coder performs ECC coding synchronously. Because the ECC algorithm takes one data block (e.g., 512 bytes) as a basic calculation unit, in Step 602, the reconfigurable control unit may automatically split the main data into more than one transmission unit (one transmission unit may be one data block of 512 bytes) if the amount of the data being continuously transmitted is larger than one data block, and write all the main data in this write operation into a buffer of the Flash.

In Step 604, while the main data are split into more than one transmission unit of 512 bytes and written into the buffer of the Flash, the simultaneously-generated ECC coding checksum data (may also be called error correction codes) are stored in the check sum buffer (may also be called a spare data ram). In Step 605, after the main data have been transmitted, the reconfigurable control unit automatically sends an address-rewrite command, CMD1, to point the Flash address pointer to a spare area of the Flash from the main data area of the Flash. In Step 606, the error correction codes stored temporarily in the check sum buffer are sent to the spare area of the Flash.

In Step 607, after all the main data are sent to the buffer of the Flash, the reconfigurable control unit automatically sends a program command, CMD2, and writes into the storage area of the Flash the data from the buffer of the Flash (including the main data and the error correction codes thereof).

Herein, the reconfigurable control unit sends an interrupt to the CPU, and the CPU reads the state information from the reconfigurable control unit, i.e., the CPU sends a state to the reconfigurable control unit and the reconfigurable control unit sends the state information to the CPU, and the CPU determines whether the write operation succeeds, and then the procedure of the write operation is completed. The CPU sends a next command of starting write operation to start a next write operation procedure.

Figure 7:
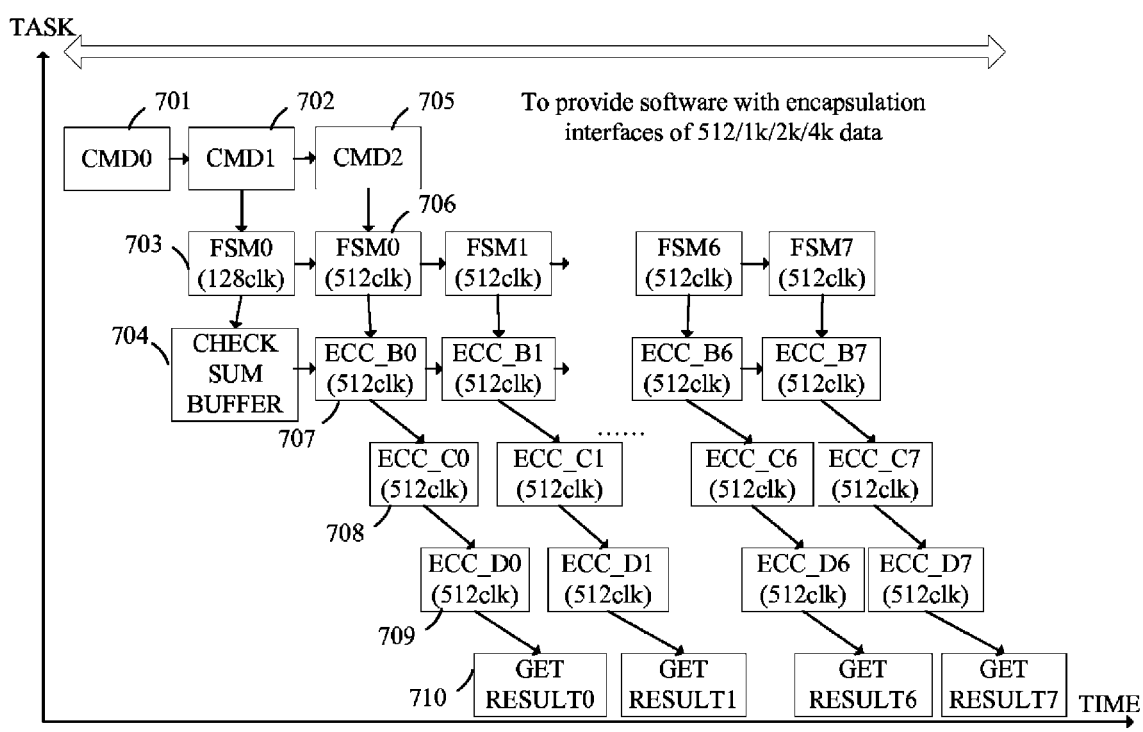
FIG. 7 is a schematic diagram illustrating a sequential chart of a read operation in accordance with an embodiment of the present invention.

The sequential chart of a read operation is shown in FIG. 7. In Step 701, after receiving a command of starting read operation sent by a CPU, a Flash controller firstly sends a first command (CMD0) to a Flash to point a Flash address pointer to a space to be read, i.e., a spare area of the Flash, and then reads main data and checksum data thereof such as error correction codes thereof into a buffer area of the Flash from a storage area of the Flash, sends a second command (CMD1) to point the Flash pointer to the spare area of a current page in Step 702, and further reads the error correction codes into a check sum buffer of the Flash controller from the buffer area of the Flash in Step 703. In Step 704, it indicates that the destination of sending data is the check sum buffer of the Flash controller.

In Step 705, after the error correction codes are read into the check sum buffer from the buffer area of the Flash, a third command (CMD2) is sent to point the Flash address pointer to a main data area of the current page. In Step 706, the reconfigurable control unit starts transmission of the main data, splits the main data to be read into several data blocks of 512 bytes, and reads the main data blocks into the Flash controller from the Flash continuously. In Step 707, synchronous ECC checking operation is performed continuously, where it takes about 1536 clock periods to perform error correction for each main data block of 512 bytes in error, and it is necessary to perform the three algorithms in FIG. 7 in turn, i.e., perform algorithm ECC_B in Step 707, algorithm ECC_C in Step 708 and algorithm ECC_D in Step 709, and one algorithm is performed based on a result of the previous algorithm and would not be performed until the previous algorithm has been performed. The above-mentioned that the previous algorithm has been performed may refer to the case that partial data of one main data block are outputted after the algorithm's processing instead of that the whole data block's data are outputted altogether after the algorithm's processing, where, the processing result of the partial data of the one main data block outputted in a step is processed in the next step. In Step 710, each data block in error is recorded, and an error report is outputted after the main data blocks have been continuously read.

As shown in FIG. 7, the performing of the ECC_B algorithm in Step 707 is accomplished simultaneously with the process of transmitting one main data block in Step 706. If the processing result of Step 707 indicates that the main data block being transmitted is in error, Step 708 is started after Step 707 is completed, and Step 709 is started after Step 708 is completed. After one main data block has been processed in Step 707, transmitting of subsequent main data blocks and performing of the ECC_B algorithm will still be continued uninterruptedly while the result outputted from Step 707 is still being processed for calculation in Step 708, and the whole procedure is performed in a pipelining manner until all the main data blocks have been transmitted. In this case, the reconfigurable control unit sends an interrupt to the CPU, and the CPU reads state information from the reconfigurable control unit, i.e., the CPU sends a state to the reconfigurable control unit and the reconfigurable control unit sends to the CPU the state information for indicating whether the read operation succeeds, and then the procedure of the read operation is completed. The CPU sends a command of starting reading main data to start a next read operation procedure.

As can be seen from the above technical schemes, during a read/write operation, the CPU firstly configures into the Flash controller information such as the size of the main data to be transmitted, addresses, commands and etc., and then sends a start command to the Flash controller. During the whole operation procedure of the Flash controller, the CPU does not intervene in the Flash controller's operations. After completing all the operations, the Flash controller sends an interrupt to the CPU, and the CPU reads the state information from the Flash controller and determines whether this read/write operation succeeds. However, in the prior art, each time when one main data block of 512 bytes is read or written, there will be accompanying coding/decoding of corresponding checksum data and the Flash controller will send to the CPU an interrupt once. Comparatively, in the technical schemes in accordance with the embodiments of the present invention, interactions between the Flash controller and the CPU can be reduced enormously and thus efficiency of the read/write operation can be increased greatly.

Figure 8:
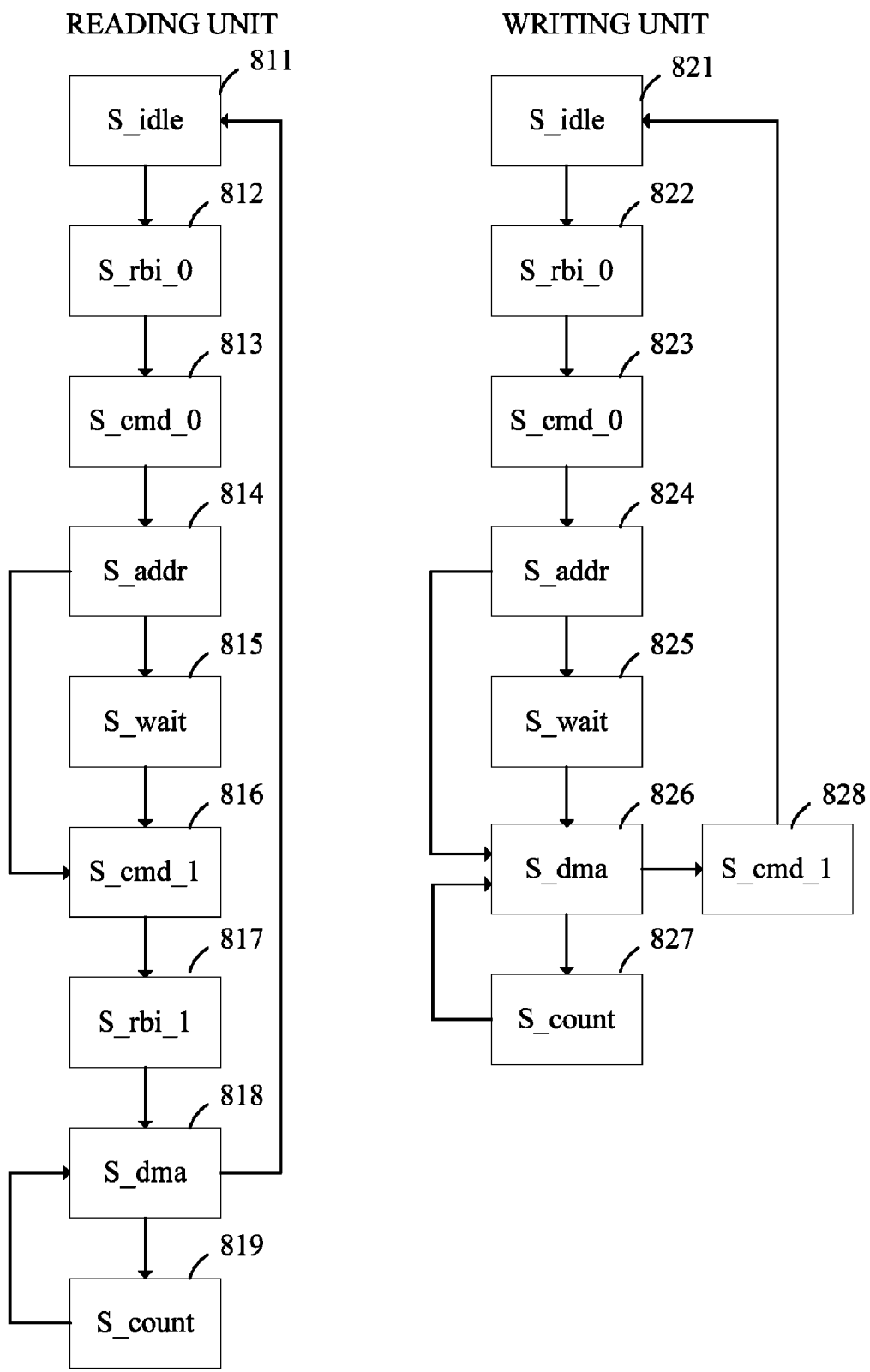
FIG. 8 is a schematic diagram illustrating a standard procedure of a reconfigurable control unit in accordance with an embodiment of the present invention; and, FIG. 9 is a schematic diagram illustrating a standard procedure of a reconfigurable control unit in accordance with another embodiment of the present invention.

FIG. 8 is a schematic diagram illustrating a control procedure of a reconfigurable control unit. As shown in FIG. 8, each Block represents one action or one standard control unit, and each standard control unit is adapted to realize at least one data access function, where, whether to perform certain standard control units specifically when the reconfigurable control unit is run depends on software configurations. Each standard control unit is described as below:

S_idle: a controller is in an idle state;

S_rbi_0: the controller detects a ready/busy state of a Flash for the first time;

S_cmd_0: the controller sends a first command;

S_addr: the controller sends a length-changeable address;

S_wait: the controller waits for completion of the Flash's decoding, this standard controller unit may not be configured if the Flash's decoding speed is quite high;

S_cmd_1: the controller sends a second command;

S_rbi_1: the controller detects the ready/busy state of the Flash for the second time;

S_dma: the controller performs DMA (Direct Memory Access) data transmission;

S_count: the controller switches ECC codec and switches transmission sectors (the transmission sectors refer to multiple main data blocks).

The standard control procedure of the reconfigurable control unit will be described hereinafter in accordance with specific embodiments.

According to an embodiment of the present invention, each standard control unit has one enabling parameter, and the method for controlling data access by using the reconfigurable control unit includes: configuring a standard procedure including at least one standard control unit. With regard to each stage of the data access, the enabling parameter of each standard control unit in the standard procedure is configured according to the current stage's corresponding data access function(s), and the enabling parameter indicates that the function of the standard control unit is to be performed or the standard control unit is to be bypassed, and thus, by performing the standard procedure, the data access function of the current stage corresponding to the enabling parameters configured currently can be accomplished.

Above all, a reading unit is taken as an example in the following description. At the beginning, the reconfigurable control unit is in an initial idle state 811, and during a read operation, a standard procedure may be formed by performing the standard control units in serial as follows: the S_rbi_0 (a standard control unit 812), the S_cmd_0 (a standard control unit 813), the S_addr (a standard control unit 814), the S_wait (a standard control unit 815), the S_cmd_1 (a standard control unit 816), the S_rbi_1 (a standard control unit 817), the S_dma (a standard control unit 818) and the S_count (a standard control unit 819).

The read operation may be divided into two stages.

At the beginning of the first stage, the reconfigurable control unit is in the initial idle state 811, the enabling parameters of the standard control units 812 to 817 are configured as "to be performed" and the enabling parameter of the standard control unit 818 is configured as "to be bypassed".

After receiving a command of starting read operation from the CPU, the Flash controller performs the standard control unit 812 to detect the ready/busy state of the Flash. If the Flash is in the ready state currently, the subsequent steps are performed.

The Flash controller performs the standard control unit 813 to send a read operation command to the Flash.

The Flash controller performs the standard control unit 814 to send a length-changeable address to the Flash. The length-changeable address includes addresses of a Flash page and a Flash's spare area.

The Flash controller performs the standard control unit 815 to wait for the completion of the Flash's address decoding.

The Flash controller performs the standard control unit 816 to instruct the Flash to read from the storage area of the Flash, according to the address of the Flash page sent by the Flash controller, main data as well as error correction codes of the main data into the buffer of the Flash.

The Flash controller performs the standard control unit 817 to detect the ready/busy state of the Flash once again so as to determine whether data reading (the reading of the main data as well as the error correction codes thereof) is completed, and proceeds to subsequent steps if the data reading is completed.

The Flash controller performs the standard control unit 818 to perform DMA transmission, and to read into the check sum buffer of the Flash controller the error correction codes from the buffer of the Flash according to the address of the Flash's spare area sent by the Flash controller.

The standard control unit 819 is not performed.

The Flash controller returns to the idle state 811 to start the second stage of the read operation. Firstly, the enabling parameters of the standard control units 813, 814, 815, 818 and 819 are configured as "to be performed", and then the enabling parameters of the standard control units 812, 816 and 817 are configured as "to be bypassed".

The standard control unit 812 is not performed.

The Flash controller performs the standard control unit 813 to rewrite an address and point an address pointer to a main data area of the Flash.

The Flash controller performs the standard control unit 814 to send to the Flash the address of the main data area of the Flash.

The Flash controller performs the standard control unit 815 to wait for the completion of the Flash's address decoding.

The command of the standard control unit 816 is not performed.

The command of the standard control unit 817 is not performed.

The Flash controller performs the standard control unit 818 to perform the DMA transmission and start to read the main data in the buffer of the Flash taking 512 bytes as one data block.

Each time when one main data block is read, the Flash controller performs the standard control unit 819 once to instruct the check unit to store a checking result of the currently-being-read main data block and to prepare for checking a next main data block read subsequently until all the main data blocks in the buffer of the Flash have been read.

The Flash controller returns to the idle state 811 again, and the read operation is completed.

Hereinafter, a writing unit is taken as an example in the following description. During a write operation, a standard procedure may be formed by performing the standard control units in serial as follows: the S_rbi_0 (a standard control unit 822), the S_cmd_0 (a standard control unit 823), the S_addr (a standard control unit 824), the S_wait (a standard control unit 825), the S_dma (a standard control unit 826), the S_count (a standard control unit 827) and the S_cmd_1 (a standard control unit 828).

The write operation may also be divided into two stages.

At the beginning of the first stage, the reconfigurable control unit is in an initial idle state 821, the enabling parameters of the standard control units 822 to 827 are configured as "to be performed", and the enabling parameter of the standard control unit 828 is configured as "to be bypassed".

At the beginning, the Flash controller is in the initial idle state 821.

After receiving a command of starting write operation from the CPU, the Flash controller performs the standard control unit 822 to detect the ready/busy state of the Flash.

The Flash controller performs the standard control unit 823 to send a write operation command to the Flash.

If the Flash is in the ready state currently, the Flash controller performs the standard control unit 824 to send a length-changeable address to the Flash. The length-changeable address includes addresses of a Flash page and a Flash's main data area.

The Flash controller performs the standard control unit 825 to wait for completion of the Flash's address decoding.

The Flash controller performs the standard control unit 826 to perform DMA transmission and write main data into the buffer of the Flash according to the address of the main data area of the Flash taking 512 bytes as one data block.

Each time when one main data block is written, the Flash controller performs the standard control unit 827 once to instruct the check unit to buffer the checksum data generated for the main data block currently being written and prepare for generating the checksum data for a next main data block written subsequently until the main data have all been written into the buffer of the Flash.

The standard control unit 828 is not performed.

The Flash controller returns to the idle state to start the second stage of the write operation. Firstly, the enabling parameters of the standard control units 823 to 826 and 828 are configured as "to be performed", and the enabling parameters of the standard control units 822 and 827 are configured as "to be bypassed".

The standard control unit 822 is not performed.

The Flash controller performs the standard control unit 823 to rewrite an address and point an address pointer to a spare area of the Flash.

The Flash controller performs the standard control unit 824 to send to the Flash the address of the spare area of the Flash.

The Flash controller performs the standard control unit 825 to wait for completion of the Flash's address decoding.

The Flash controller performs the standard control unit 826 to perform the DMA transmission and write error correction codes into the buffer of the Flash according to the address of the spare area of the Flash.

The Flash controller performs the standard control unit 828 to instruct the Flash to write into the storage area of the Flash, according to the address of the Flash page sent by the Flash controller, the main data as well as the error correction codes of the main data from the buffer of the Flash.

The command of the standard control unit 827 is not performed.

The Flash controller returns to the idle state 821, and the write operation is completed.

All the above actions/states of the reconfigurable control unit are configured according to read/write features of the Flash, and can be reduced arbitrarily, and any of the standard control units may be configured as "to be performed" or "to be bypassed" according to various demands so as to reconfigure various read/write control sequences.

As can be seen from control procedures of the above reconfigurable control unit, one read/write operation can be implemented by performing the reading/writing unit twice, and furthermore, each time when the read/write unit is performed, it is needed to perform or bypass one or more standard control units in the standard procedure to realize access to different data without designing any new standard control units. Consequently, the Flash controller has much higher compatibility with different data. Meanwhile, the data read/write is implemented by multiple standard control units combined together, and therefore, in case that the existing control unit can not meet the requirements, it is only necessary to replace some of the standard control units therein instead of replacing the whole control unit, thereby flexibility and extendibility of the Flash controller is raised.

Figure 9:
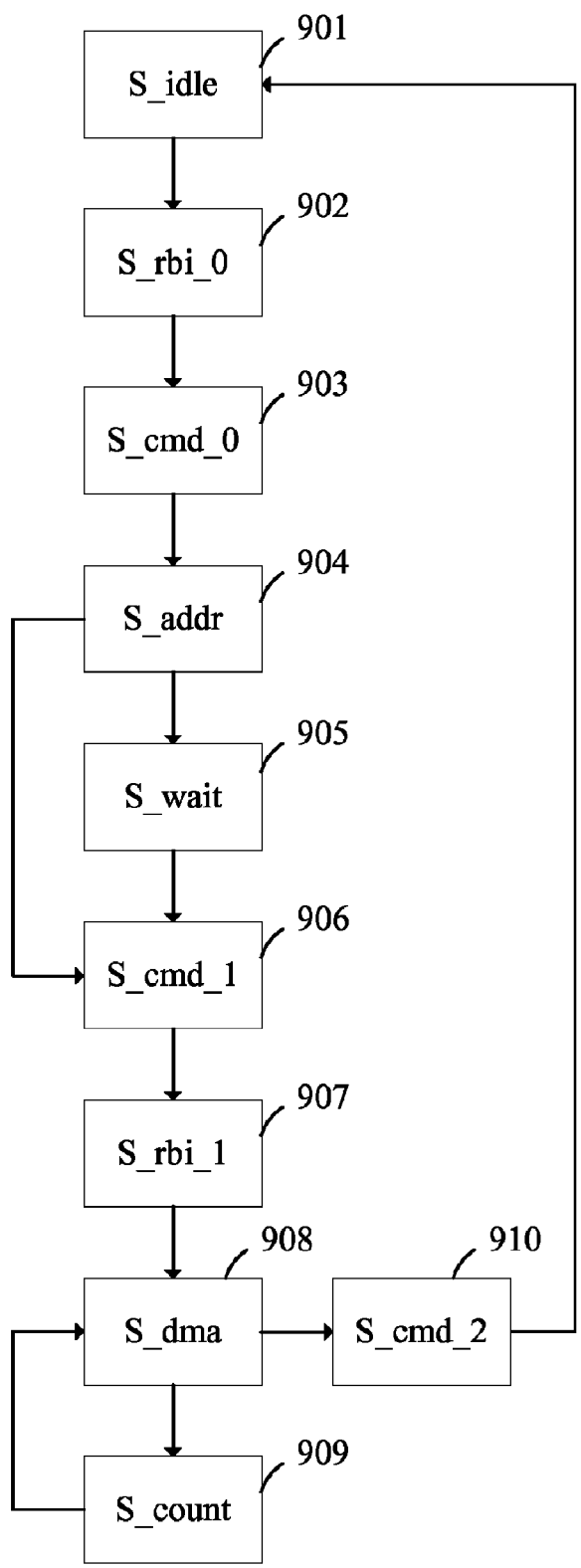

In accordance with an embodiment of the present invention, the reading unit and the writing unit shown in FIG. 8 may correspond to two independent standard procedures realized by different hardware or software, and alternatively may correspond to the same standard procedure of data access, which realizes specific read or write function through performing or bypassing certain standard control unit(s) in the standard procedure. FIG. 9 is a schematic diagram illustrating a standard procedure in which the reading unit and the writing unit are combined together to form one reading/writing access control unit. As shown in FIG. 9, during a read and/or write operation, one standard procedure may be formed by performing the standard control units in serial as follows: the S_rbi_0 (a standard control unit 902), the S_cmd_0 (a standard control unit 903), the S_addr (a standard control unit 904), the S_wait (a standard control unit 905), the S_cmd_1 (a standard control unit 906), the S_rbi_1 (a standard control unit 907) and the S_dma (a standard control unit 908), the S_count (a standard control unit 909) and the S_cmd_2 (a standard control unit 910).

Herein, the read operation may be divided into two stages. At the first stage, the enabling parameters of the standard control units 902 to 908 are configured as "to be performed", and the enabling parameters of the standard control units 909 and 910 are configured as "to be bypassed". At the second stage, the enabling parameters of the standard control units 903, 904, 905, 908 and 909 are configured as "to be performed", and the enabling parameters of the standard control units 902, 906, 907 and 910 are configured as "to be bypassed". The specific control procedure is similar to the reading unit's shown in FIG. 8, and will not be described in detail again.

Similarly, the write operation may also be divided into two stages. At the first stage, the enabling parameters of the standard control units 902 to 905, 908 and 909 are configured as "to be performed", and the enabling parameters of the standard control units 906, 907 and 910 are configured as "to be bypassed". The specific procedure is similar to the writing unit's shown in FIG. 8, and will not be described in detail again. At the second stage, the enabling parameters of the standard control units 903, 904, 905, 908 and 910 are configured as "to be performed", and the enabling parameters of the standard control units 902, 906, 907 and 909 are configured as "to be bypassed". During the specific implementation procedure, compared with the second stage of the writing unit in FIG. 8, the functions in the second stage of operation shown in FIG. 8 can be realized by replacing the standard control unit 910 in FIG. 9 by the standard control unit 828 in FIG. 8, which will not be described in detail again.

In the technical schemes in accordance with the embodiments of the present invention, one read/write operation can transmit one page of data in the Flash, one page of data are divided into multiple sectors of data which are split at the S_count state and are transmitted at the S_dma state.

The CPU may send multiple groups of commands to the Flash controller; and, after performing one group of commands, the Flash controller can automatically perform a next group of commands, thereby frequency of the CPU's intervention to hardware in reading/writing can be reduced and performing efficiency of the hardware can be raised.

In the technical scheme provided by the embodiments of the present invention, after receiving a command of starting write operation from the CPU, the Flash controller configured with a check sum buffer generates checksum data of a main data block during transmitting the main block, and buffers the checksum data into the check sum buffer; after all the main data blocks have been transmitted, the checksum data of all the main data blocks are transmitted altogether to the Flash. Because main data and check codes (may also be called check data or checksum data) are processed synchronously, multiple main data blocks can be transmitted altogether and their checksum data are transmitted after all the main data blocks have been transmitted, and consequently, the CPU only needs to send the command of stating write operation once during the transmission of multiple main data blocks. In contrast, in the prior art, since the checksum data can not be buffered after the CPU sends a command of starting write operation, the checksum data of one main data block has to be transmitted immediately after the one main data block is transmitted, and the CPU has to send another command of starting write operation when the next main data block is transmitted. Therefore, compared with the prior art, in the technical scheme provided by the embodiments of the present invention, frequent intervention from the CPU can be avoided, and thus data-access efficiency can be raised.

Similarly in read operation, each time when one main data block is transmitted, it is not necessary to read the checksum data of the one main data block during checking the main data blocks because the checksum data can all be transmitted to the buffer of the Flash controller firstly. Therefore, the case that the CPU intervenes each time when one main data block is transmitted can be avoided, and thereby data-access efficiency is raised.

Meanwhile, by adopting a reconfigurable control unit to configure a standard procedure, when the present control unit can not meet requirements, it only needs to replace certain standard control unit(s) therein instead of replacing the whole control unit and therefore flexibility and extendibility of the Flash controller is improved.

Comparisons between the embodiments of the present invention and the prior art are as follows:

The conventional Flash controller always takes the data block of 512 bytes as a basic processing unit, and the CPU needs to perform eight control operations in order to process one Flash page of 4K bytes, however, according to the technical schemes in the embodiments of the present invention, the CPU only needs to perform one control operation to accomplish that. Therefore, compared with the prior art, the hardware in the technical schemes of the embodiments of the present invention has higher performing efficiency.

The conventional error correction algorithm needs more than 1K clock periods each time when checking error correction codes in case that main data are in error, while each main data block has only 512 bytes and it takes only 512 clock periods to read each main data block. And therefore, after each main data block has been read, the error correction code checking for the current main data block can not be completed until at least another 512 clock periods later, and thus the reading of the main data has to be paused. The technical schemes in the embodiments of the present invention adopts three levels of pipelining error correction code checking where each level's process is completed within 512 clock periods, and the Flash controller can thus read the main data from the Flash without any limitation from the operations for error correction codes, and the main data reading and the error correction code checking are performed in parallel and do not affect each other. The peak value of the Flash's reading operation speed in such technical schemes can be increased by a factor of at least two.

The foregoing is only embodiments of the present invention but is not for use in limiting the protection scope of the present invention.

What is claimed is:

1. A method for controlling access to data in a Flash, comprising:
   outputting at least one main data block to a buffer area of the Flash continuously, the buffer area of the Flash being adapted to buffer data to be output to a storage area of the Flash;
   generating checksum data for each main data block and buffering the generated checksum data when outputting the at least one main data block to the buffer area of the Flash;
   outputting the buffered checksum data of the at least one main data block to the buffer area of the Flash;
   receiving a command of starting write operation from a CPU before outputting the at least one main data block to the buffer area of the Flash; and
   after the at least one main data block and the checksum data thereof have been outputted to the storage area of the Flash from the buffer area of the Flash, sending an interrupt to the CPU, receiving a state from the CPU, and sending to the CPU state information for indicating whether a write operation is successful.

2. The method of claim 1, further comprising:
   outputting to the storage area of the Flash the at least one main data block and the checksum data thereof from the buffer area of the Flash after the checksum data of the at least one main data block have been outputted to the buffer area of the Flash.

3. The method of claim 1, wherein outputting the at least one main data block to the buffer area of the Flash comprises:
   pointing an address pointer for writing to a main data area of the Flash; and
   outputting the at least one main data block to the buffer area of the Flash according to the address pointer for writing.

4. The method of claim 1, wherein outputting the buffered checksum data of the at least one main data block to the buffer area of the Flash comprises:
   pointing an address pointer for writing to a spare area of the Flash; and
   outputting the buffered checksum data of the at least one main data block to the buffer area of the Flash according to the write address pointer.

5. The method according to claim 1, being implemented by a controller, the controller comprising a check unit adapted to generate check data and check main data, and more than one standard control unit, each standard control unit being adapted to perform at least one data access function and being configured with one enabling parameter; the more than one standard control unit comprising: a ready/busy state detection unit, a first command unit, a second command unit, an address sending unit, a transmission unit and a switching unit, which are configured as being performed one by one in an order of: the ready/busy state detection unit, the first command unit, the address sending unit, the transmission unit, the switching unit and the second command unit, and the performed order forming a standard procedure;
   the process of the data access comprising a first stage and a second stage, wherein:
   in the first stage, the enabling parameters of the ready/busy state detection unit, the first command unit, the address sending unit, the transmission unit and the switching unit are configured as to be performed, and the enabling parameter of the second command unit is configured as to be bypassed;
   when the standard procedure is performed in the first stage, if the ready/busy state detection unit detects that the Flash is ready, the first command unit sends a write operation command to the Flash, the address sending unit sends a first address to the Flash, the transmission unit writes at least one main data block into a buffer area of the Flash according to the first address sent by the address sending unit, and each time when one main data block is written, the switching unit instructs the check unit to buffer the checksum data generated for the one main data block currently written and to prepare generating the checksum data for the next main data block to be written;
   in the second stage, the enabling parameters of the first command unit, the address sending unit, the transmission unit, the switching unit and the second command unit are configured as to be performed, and the enabling parameters of the ready/busy state detection unit and the switching unit are configured as to be bypassed; and
   when the standard procedure is performed in the second stage, the first command unit sends an address rewriting command to the Flash, the address sending unit sends a second address to the Flash, the transmission unit continuously outputs the checksum data of the at least one main data block to the buffer area of the Flash according to the second address sent by the address sending unit, the second command unit outputs to the storage area of the Flash the at least one main data block and the checksum data thereof from the buffer area of the Flash.

6. A method for controlling access to data in a Flash, comprising:
   buffering checksum data of at least one main data block from a buffer area of the Flash, the buffer area of the Flash being adapted to buffer the at least one main data block and the checksum data thereof from a storage area of the Flash; and
   reading the at least one main data block from the buffer area of the Flash continuously, and checking and correcting errors of the at least one main data block according to the buffered checksum data of the at least one main data block when reading the at least one main data block continuously,
   wherein checking and correcting errors of the at least one main data block comprises:
   for each main data block, processing the checksum data of the main data block according to a first algorithm, and determining whether the main data block is in error, wherein, if it is determined that one main data block is in error, using a second algorithm and a third algorithm in turn to process the result obtained by processing the checksum data of the one main data block according to the first algorithm, recording a processing result of the third algorithm, and outputting an error report after the at least one main data block has been read continuously.

7. The method of claim 6, wherein the at least one main data block and the checksum data thereof buffered in the buffer area of the Flash being continuously transmitted to the buffer area of the Flash from the storage area of the Flash.

8. The method of claim 7, further comprising:
receiving a command of starting read operation from a CPU before the at least one main data block and the checksum data thereof are continuously transmitted to the buffer area of the Flash from the storage area of the Flash;
after the errors of the at least one main data block have been checked and corrected, sending an interrupt to the CPU, receiving a state from the CPU, and sending to the CPU state information for indicating whether a read operation is successful.

9. The method of claim 6, wherein buffering the checksum data from the buffer area of the Flash comprises:
pointing an address pointer for reading to a spare area of the Flash; and,
receiving the checksum data from the buffer area of the Flash according to the address pointer for reading and buffering the received checksum data.

10. The method of claim 6, wherein reading the at least one main data block from the buffer area of the Flash continuously comprises:
pointing an address pointer for reading to a main data area of the Flash; and,
reading the at least one main data block from the buffer area of the Flash continuously according to the address pointer for reading.

11. The method according to claim 6, being implemented by a controller, the controller comprising a check unit adapted to generate check data and check main data, and more than one standard control unit, each standard control unit being adapted to perform at least one data access function and being configured with one enabling parameter; the more than one standard control unit comprising: a first ready/busy state detection unit, a second ready/busy state detection unit, a first command unit, a second command unit, an address sending unit, a transmission unit and a switching unit, which are configured as being performed one by one in an order of: the first ready/busy state detection unit, the first command unit, the address sending unit, the second command unit, the second ready/busy state detection unit, the transmission unit and the switching unit, and the performed order forming a standard procedure;
the process of the data access comprising a first stage and a second stage, wherein:
in the first stage, the enabling parameters of the first ready/busy state detection unit, the first command unit, the address sending unit, the second command unit, the second ready/busy state detection unit and the transmission unit are configured as to be performed, and the enabling parameter of the switching unit is configured as to be bypassed;
when the standard procedure is performed in the first stage, if the first ready/busy state detection unit detects that the Flash is ready, the first command unit sends a read operation command to the Flash, the address sending unit sends a third address to the Flash, the second command unit instructs the Flash to read into a buffer area of the Flash at least one main data block and the checksum data thereof from a storage area of the Flash according to the third address sent by the address sending unit, and the transmission unit reads the check data from the buffer area of the Flash if the second ready/busy state detection unit detects that the Flash is ready;
in the second stage, the enabling parameters of the first command unit, the address sending unit, the transmission unit and the switching unit are configured as to be performed, and the enabling parameters of the first ready/busy state detection unit, the second command unit and the second ready/busy state detection unit are configured as to be bypassed; and
when the standard procedure is performed in the second stage, the first command unit sends an address rewriting command to the Flash, the address sending unit sends a fourth address to the Flash, the transmission unit continuously reads the at least one main data block to the buffer area of the Flash according to the fourth address sent by the address sending unit, and each time when one main data block is read, the switching unit instructs the check unit to buffer a checking result of the one main data block currently read and to prepare for checking the next main data block to be read.

12. A controller for controlling access to data in a Flash, comprising:
a first unit, adapted to output at least one main data block continuously to a buffer area of the Flash, and write the at least one main data block and checksum data thereof into a storage area of the Flash from the buffer area of the Flash after a second unit outputs to the buffer area of the Flash the at least one main data block's checksum data buffered in the second unit;
the second unit, adapted to generate the checksum data for each main data block and buffer the generated checksum data when the first unit outputs the at least one main data block to the buffer area of the Flash, and output the buffered checksum data of the at least one main data block to the buffer area of the Flash; and
a third unit,
wherein the first unit is further adapted to:
output the at least one main data block to the buffer area of the Flash continuously after receiving a command of starting write operation sent by a CPU via the third unit, and
after the at least one main data block and the checksum data thereof have been written into the storage area of the Flash from the buffer area of the Flash, send an interrupt to the CPU via the third unit, receive a state from the CPU, and send to the CPU state information for indicating whether a write operation is successful.

13. The controller of claim 12, further comprising a fourth unit,
the first unit being adapted to continuously output the at least one main data block to the buffer area of the Flash via the fourth unit; and
the second unit being adapted to output the buffered checksum data to the buffer area of the Flash via the fourth unit.

14. A controller for controlling access to data in a Flash, comprising:
a first unit, adapted to continuously transmit at least one main data block and checksum data thereof from a storage area of the Flash to a buffer area of the Flash, and instruct the buffer area of the Flash to transmit the checksum data to a second unit, and continuously read the at least one main data block from the buffer area of the Flash;

the second unit, adapted to buffer the checksum data of the at least one main data block from the buffer area of the Flash, and check and correct errors of the at least one main data block according to the buffered checksum data when the first unit reads the at least one main data block from the buffer area of the Flash; and a third unit, wherein the first unit is further adapted to:

output to the buffer area of the Flash the at least one main data block and the checksum data thereof from the storage area of the Flash after receiving a command of starting read operation sent by a Central Processing Unit, CPU, via the third unit; and after the at least one main data block has been read continuously from the buffer area of the Flash, send an interrupt to the CPU via the third unit, receive a state from the CPU, and send to the CPU state information for indicating whether a read operation is successful.

15. The controller of claim 14, further comprising a fourth unit, the first unit being adapted to read the at least one main data block continuously from the buffer area of the Flash via the fourth unit; and the second unit being adapted to receive the checksum data of the at least one main data block from the buffer area of the Flash via the fourth unit, and buffer the checksum data.

16. The controller of claim 15, wherein the second unit comprises:

a second module, adapted to buffer the checksum data received from the buffer area of the Flash via the fourth unit;

a third module, adapted to, for each main data block continuously outputted by the first unit from the buffer area of the Flash, process the checksum data of the main data block buffered in the second module according to a first algorithm, determine whether the main data block is in error, and send to a fourth module a processing result of the first algorithm for the checksum data of one main data block if it is determined that the one main data block is in error;

the fourth module, adapted to process the processing result of the first algorithm sent by the third module according to a second algorithm;

a fifth module, adapted to process the processing result of the second algorithm sent by the fourth module according to a third algorithm, record a processing result of the third algorithm, and output an error report after the at least one main data block has been read continuously.

* * * * *